United States Patent [19]
Midttveit

[11] Patent Number: 6,050,747
[45] Date of Patent: Apr. 18, 2000

[54] ROTATING CONNECTOR FOR OPERATIVE CONNECTION BETWEEN A BUOY AND A FLOATING VESSEL FOR THE PRODUCTION OF HYDROCARBONS

[75] Inventor: Steinar Midttveit, Godvik, Norway

[73] Assignee: Den Norske Stats Oljeselskap A.S., Stavanger, Norway

[21] Appl. No.: 08/981,719

[22] PCT Filed: Jun. 19, 1996

[86] PCT No.: PCT/NO96/00150

§ 371 Date: Dec. 22, 1997

§ 102(e) Date: Dec. 22, 1997

[87] PCT Pub. No.: WO97/00806

PCT Pub. Date: Jan. 9, 1997

[30] Foreign Application Priority Data

Jun. 22, 1995 [NO] Norway ................................. 952513

[51] Int. Cl.[7] .................................................. B63B 22/26
[52] U.S. Cl. .......................... 405/224.2; 441/5; 166/345
[58] Field of Search .................................. 166/65.1, 344, 166/355, 352, 345; 441/3, 4, 5; 405/224, 224.2; 285/121.3, 121.6, 153.1

[56] References Cited

U.S. PATENT DOCUMENTS 5,651,708  7/1997  Borseth ....................................... 441/5
5,697,732  12/1997  Sigmundstad ........................... 405/169
5,895,077  4/1999  Sigmundstad ............................. 285/96

*Primary Examiner*—Eileen Dunn Lillis
*Assistant Examiner*—Sunil Singh
*Attorney, Agent, or Firm*—Scully, Scott, Murphy & Presser

[57] ABSTRACT

A rotating connector or coupling device for interconnection between at least one fluid passage (9) through a submerged buoy (1, 2) and a pipe system on a floating vessel for the production of hydrocarbons, comprising a pair of cooperating, fluid-transferring swivel members in the form of a female member (3) and a male member (4) which may be introduced axially into or withdrawn from each other, the female member (4) being permanently fixed to the buoy (1, 2), and an electrohydraulic swivel (30) which is arranged on the top of the male swivel member (4) and comprises partly a slip-ring arrangement (37, 45) for the transfer of high electric power and electrical/optical control signals, and partly a number of hydraulic courses for the transfer of hydraulic signals. The female and male swivel members (3, 4) include cup-like housing members (60, 61) which are insertable into each other and which, at their lower ends, have coupling discs (62, 63) with cooperating connector parts (81, 82; 83, 84) forming past of respective underwater couplers (72, 73), the housing members (60, 61) being arranged to be filled with water, for submerged operation of the underwater couplers (72, 73).

6 Claims, 4 Drawing Sheets

ROTATING CONNECTOR FOR OPERATIVE CONNECTION BETWEEN A BUOY AND A FLOATING VESSEL FOR THE PRODUCTION OF HYDROCARBONS

BACKGROUND OF THE INVENTION

1. Field of the Invention

The invention relates to a rotating connector for interconnection between at least one fluid passage through a submerged buoy and a pipe system on a floating vessel for the production of hydrocarbons, comprising a pair of cooperating, fluid-transferring swivel members in the form of a female member and a male member which may be introduced axially into or withdrawn from each other, the female member being permanently fixed to the buoy, and an electrohydraulic swivel constituting a part of the male member and being arranged for transfer of electrical power and electrical and hydraulic control signals, the swivel members at their lower ends comprising cooperating connector parts for interconnection of respective power, signal and hydraulic lines from the swivel and from the buoy.

2. Discussion of the Prior Art

A rotating connector or coupling device comprising cooperating swivel members of the above-mentioned type for example is known from Norwegian patent application No. 932460. This application describes a system for offshore production of hydrocarbons by means of a vessel which is arranged for quick connection to or disconnection from a submerged buoy, where the buoy is of the type comprising a bottom-anchored centre member which is connected to a number of risers extending up to the buoy, and an outer buoyancy member which is rotatably mounted on the centre member and may be introduced and locked in a submerged downwardly open receiving space in the vessel. At the upper end of the buoy there is arranged a rotating coupling or swivel device of the stated type, wherein the swivel members define mutually sealed annular spaces or annuluses communicating with associated fluid paths in the swivel members, for the transfer of process fluid and possible injection fluids between the risers and a pipe system on the vessel. The female swivel member is permanently fixed to the centre member of the buoy whereas the male member is connected to an operating means on the vessel, so that the swivel members may be introduced into and withdrawn from each other by the operating means, the swivel members defining said annuluses in interconnected condition. On each side of the annuluses there is provided for sealing means which may be activated by means of a pressure fluid to form a seal between the annuluses, and which may be relieved in case of mutual disconnection of the swivel members.

An electrohydraulic swivel which is arranged such as stated in the introduction, is not described in said patent application. However, such an arrangement lately has become known in the market in connection with the development and production of the introductorily stated connector. In the known device the electrohydraulic swivel is arranged at the lower end of the device and is constructed for the transfer of electrical power at intermediate voltages, i.e. of the order of 1000 volts. However, in operation of production vessels of the topical type it is desirable to be able to transfer electrical power of a substantially higher value than with the known connector, e.g. 10–12 MVA or higher. The corresponding voltage and current values in three-phase transmission may be about 11 kV and 600 A, or higher. An electrohydraulic swivel for the transfer of such a high electrical power requires a larger space than what is allowed by the known connector. Further, the known arrangement is not so flexible as desirable as regards the possibility to satisfy special customer specific demands and needs. In addition, in order to satisfy the demands to security in the topical operating environment, there is a need to take special precautionary measures, in order to avoid explosion hazard.

SUMMARY OF THE INVENTION

It is thus an object of the invention to provide a rotating connector having an electrohydraulic swivel which is able to transfer high electrical power, and wherein the construction gives a great flexibility with respect to user adaptation, at the same time as the construction in total is compact and operationally safe.

The above mentioned object is achieved with a rotating connector of the introductorily stated type which, according to the invention, is characterized in that the electrohydraulic swivel is arranged on the top of the male swivel member and comprises a slip-ring arrangement for the transfer of high electrical power and control signals, and that the female and male swivel members comprise cup-like housing members which are insertable into each other and have coupling discs with cooperating connector parts forming part of respective underwater couplers, the housing members being arranged to be filled with water, for submerged operation of the underwater couplers.

By placing the electrohydraulic swivel uppermost in the rotating connector, there is obtained a flexible arrangement making it possible to comply with as many customer specific demands as possible, i.e. one achieves an increased flexibility with respect to power quantity, the number of "consumers" which can be supplied simultaneously, etc. By means of the stated structure comprising water-filled housing members and underwater couplers there is obtained an explosion-safe arrangement, the constituent elements being kept at a low surface temperature, so that one is secured against the danger of explosion because of ignition of explosion-hazardous gases which may occur in the topical operating environment.

BRIEF DESCRIPTION OF THE DRAWINGS

The invention will be further described below in connection with an exemplary embodiment with reference to the drawings, wherein.

DETAILED DESCRIPTION OF A PREFERRED EMBODIMENT

Figure 1:
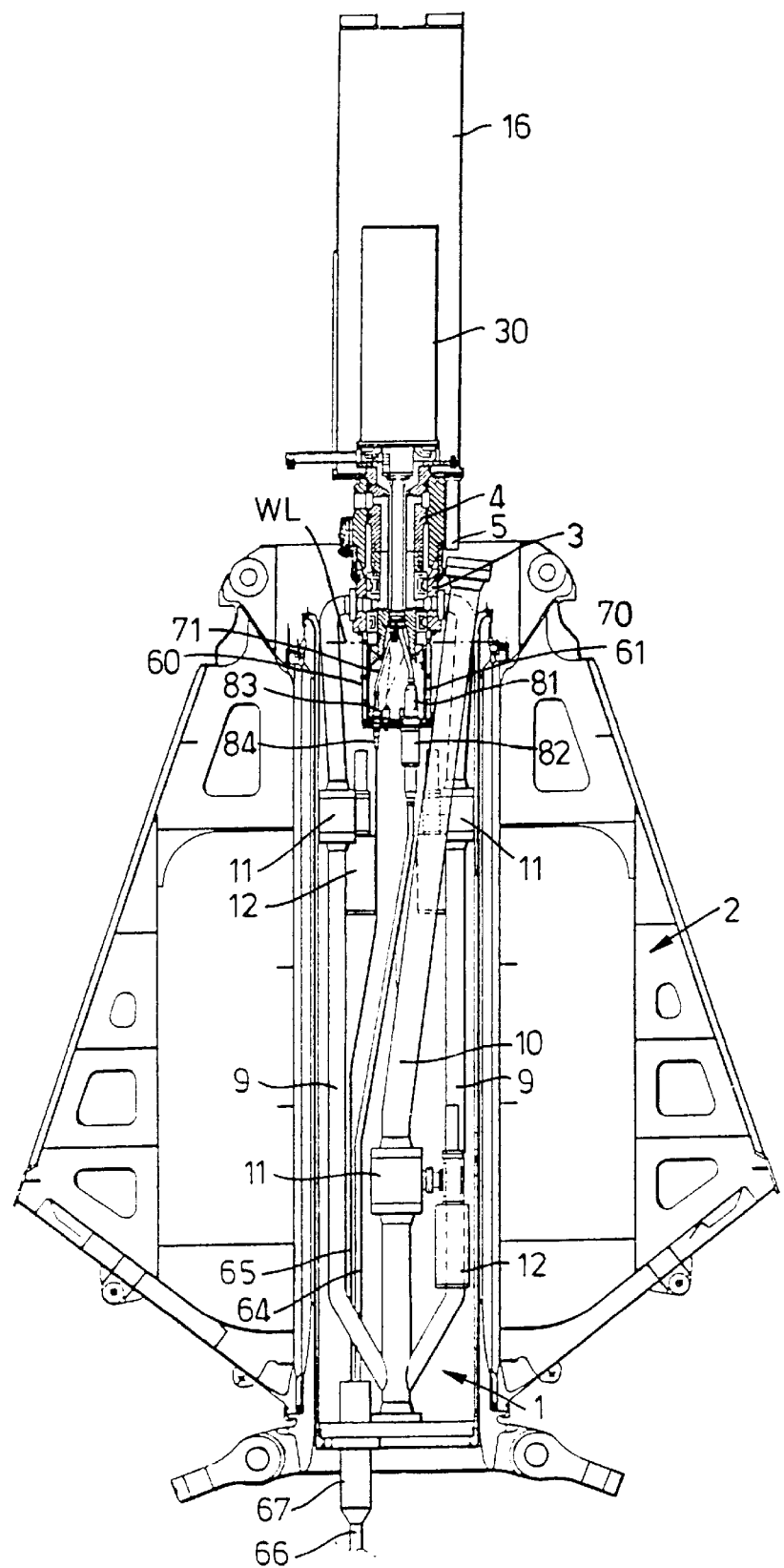
FIG. 1 shows an axial longitudinal section through a buoy at the upper end of which there is arranged a rotating connector according to the invention.

The buoy shown in FIG. 1 is of the introductorily stated type which comprises a bottom-anchored centre member and an outer buoyancy member 2 which is rotatably mounted on the centre member and is intended for introduction and releasable securing in a submerged receiving space (not shown) in a floating production vessel. The rotating connector or coupling device which is arranged at the upper end of the buoy, comprises a pair of cooperating swivel members in the form of a female member 3 which is permanently fastened to the centre member 1 of the buoy, and a male member 4 which may be inserted axially into or withdrawn from the female member by means of an operating means As better shown in the enlarged view of FIG. 2, the swivel members define an annular space or annulus 6 communicating with a pair of fluid paths or fluid courses 7 in the female member 3 and a pair of fluid courses 8 in the male member 4, for the transfer of process fluid between transfer pipes 9 extending through the centre member 1 of the buoy, and a pipe system (not shown) on the vessel. As will be clear, the transfer pipes 9 at the lower end will be connected to a riser (not shown) which is connected to the buoy. In the shown embodiment there are used two parallel fluid paths in order to achieve a sufficient flow capacity with a reduced diameter of the fluid courses 8 as compared to using a single course through the male swivel member.

As will be appreciated, the shown exemplary embodiment is intended for the case wherein only one process fluid is to be transferred through the connector. When several fluids are to be transferred, for instance when water injection in the topical reservoir is necessary, the connector will be provided with a number of annuluses, fluid courses and sealing means which correspond to the topical need.

As appears from FIG. 1, in the centre member of the buoy there is also arranged a pipe stretch 10 debouching into a flange connection at the upper end of the buoy. This pipe stretch is arranged for pigging purposes, for introduction of a pig into the riser which is connected to the buoy, for inspection or maintenance purposes. The pigging pipe 10 as well as the transfer pipes 9 are provided with closing valves 11 which can be operated by means of hydraulic actuators 12.

On each side of the annulus 6 the male member 4 is provided with a peripheral annular groove receiving a radially movable ring element 13 having a static sealing means for static sealing against the female swivel member 3, and having dynamic sealing means for sealing between the ring element 13 and the side walls of the annular groove. The sealing means can be operated hydraulically by means of a barrier liquid having a higher pressure then the process fluid pressure. For a closer description of the constructive embodiment and the manner of operation of this arrangement reference is made to the introductorily mentioned patent application No. 932460.

As mentioned above, the male swivel member 4 may be introduced into or withdrawn from the female swivel member 3 by an operating means 5. This is in the form of a telescopic, hydraulic cylinder which is supported by a ring flange 14 to which there is fastened a guide sleeve 15 in which the male swivel member 4 is slidably mounted. The ring flange 14 supports a protecting housing 16 receiving the male swivel member when this is pulled up from the female swivel member. At its upper end the protecting housing is coupled to a crane (not shown) by means of which the housing 16 together with the guide sleeve 15 and the male swivel member 4 which is pulled up into the housing, can be removed from the space above the buoy (when this is to be introduced into the receiving space in the vessel), or brought into position above the female swivel member 3 when the swivel members are to be interconnected.

As appears, the female swivel member 3 at its upper end is provided with a rotatably mounted holding ring 17, whereas the lower end of the guide sleeve 15 is downwardly tapering and adapted for introduction into the holding ring 17. When the male swivel member is to be introduced into the female swivel member, the housing 16 and the guide sleeve 15 are firstly lowered in coarsely centred position above the female member, so that the guide sleeve is introduced to an abutment position in the holding ring 17. Thereafter the guide sleeve is locked to the holding ring by means of locking means consisting of hydraulic locking cylinders 18 which are fastened to the outer side of the guide sleeve. In this manner there is secured an accurate positioning of the swivel members relative to each other, so that the male member can be introduced into and withdrawn in a safe and gentle manner, and the dimensional tolerances of the swivel members thereby may be kept at a minimum.

It is to be remarked that the fluid courses 8, via the shown annulus 19 and the associated passage 20 through the guide sleeve 15, is connected to said pipe system on the vessel via a flexible hose (not shown), in order to allow the movements of the guide sleeve in connection with the above mentioned manipulation of the male swivel member. Further, it is to be remarked that, on each side of the annulus 19, there are arranged hydraulically operated seals 21 for static sealing between the male swivel member and the guide sleeve when the male member has been brought in place in the female member.

The rotating coupling device or "connector" is provided with an electrohydraulic swivel 30 forming part of the male swivel member and being arranged at the top thereof, as shown in FIG. 1. This swivel has for its task to transfer electrical power from the production vessel to the topical subsea installation, and moreover to transfer all necessary electrical and hydraulic control signals to the subsea installation. It is also conceivable that it may be used to transfer electrical power and/or electrical and hydraulic control signals to the vessel from other installations, both at the surface and under water.

Figure 3:
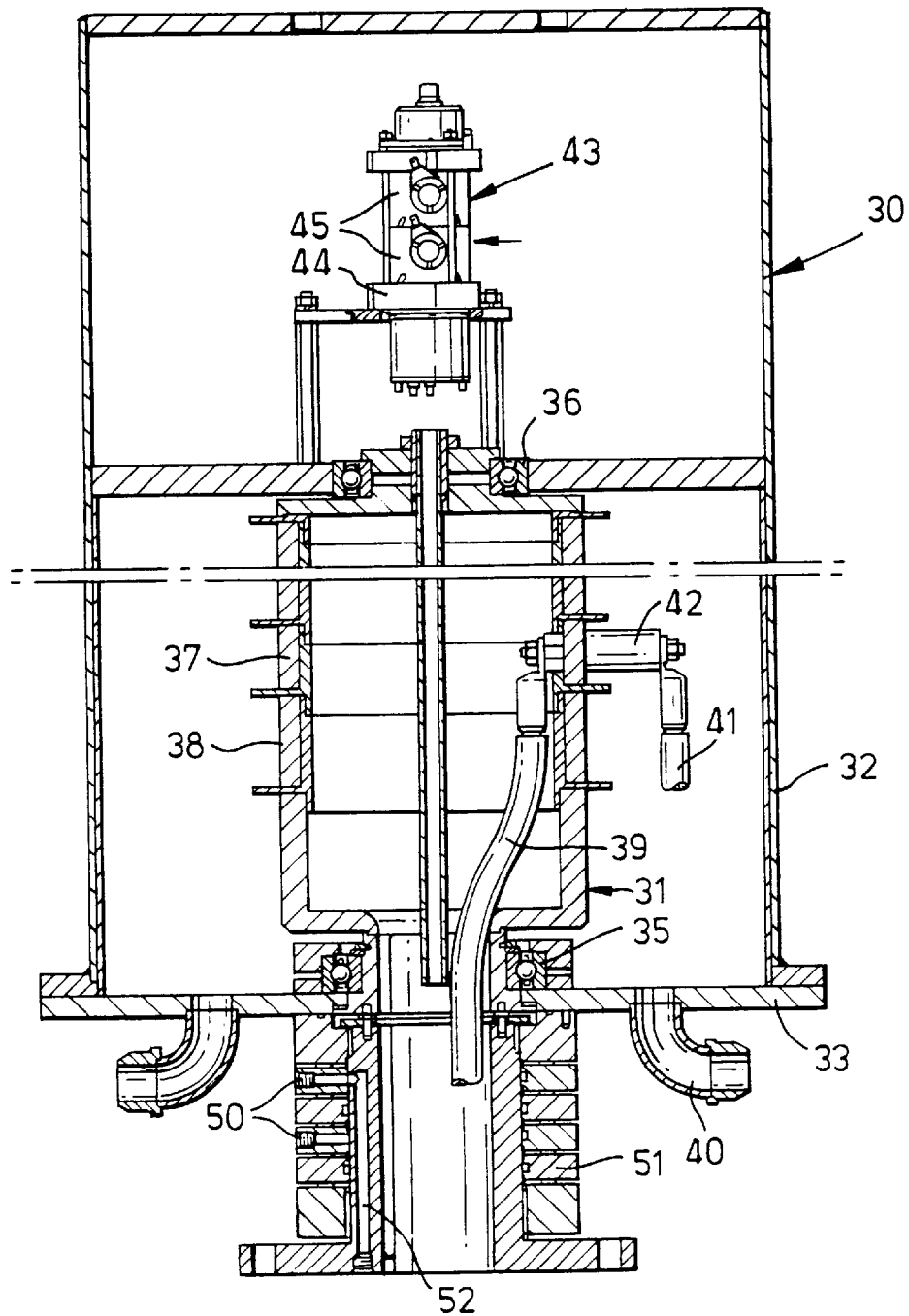
FIG. 3 shows an axial section through an embodiment of the electrohydraulic swivel.

An embodiment of the electrohydraulic swivel 30 is schematically shown in longitudinal section in FIG. 3. This swivel structure is commercially available and supplied by the company Focal Technologies Inc., Nova Scotia, Canada. The swivel is constructed for the transfer of high electrical power and in the illustrated case is intended for three phase transfer with the introductorily stated voltage and current values (11 kV/600 A, i.e. approximately 11,4 MVA).

In principle, the swivel comprises a central, hollow "column member" 31 which in operation is fixedly connected to the female swivel member 3 and thus is stationary relative to the centre member 1 of the buoy, and an outer cover member 32 having a lower bottom plate 33 which is fixedly connected to a carrier flange 34 at the top of the male swivel member 4, so that the cover member in operation is stationary relative to the vessel. As shown, the cover member 32 is rotatably mounted on the column member 31 by means of a pair of bearings 35 and 36.

Within the cover member 32 the column member 31 is provided with a slip-ring arrangement consisting of three slip rings 37 (only one is shown) which are insulated from each other by means of intermediate insulating rings 38. To each slip ring there is connected a power cable 39 which is led down through a central passage in the column member 31 and further down through the male swivel member, as further described below. The power cables from the vessel are introduced into the cover member via respective curved pipe sockets 40 which are fastened to the underside of the bottom plate 33 of the cover member with a mutual angular distance of 90°, i.e. there are four pipe sockets of which three are used for the power cables. Only one power cable 41 is partly shown, and this is in contact with the associated slip ring 37 via a contact piece 42.

In FIG. 3 there are not shown slip rings for electrical control signals. Instead the swivel is shown to comprise a slip-ring means 43 for transferring fibre-optical signals. This means comprises a supporting member 44 which is rigidly connected to the cover member 31 and which in the illustrated case comprises a pair of fibre-optical slip rings 45. The fibre-optical lines are not shown in the Figure.

The swivel 30 is oil-filled and pressure-compensated, and the power cables entering the swivel are presupposed to be carried in oil-filled hoses. These cables in practice come from a connecting box (not shown) which, via ship cables, is coupled via a power switch to a high-voltage distribution panel. The electrohydraulic swivel also comprises hydraulic courses for the transfer of hydraulic signals, and also for pressurization of the aforementioned sealing means forming part of the rotating connector. In the illustrated embodiment there are arranged four courses of which each comprises a passage 50 extending radially through a cylindrical transition member 51 which surrounds the column member 31 and is fastened to the bottom plate 33 of the cover member, and an associated annulus and an axial passage 52 extending through the column member and debauching on the underside thereof. Said courses are connected to hydraulic lines 53 which are only suggested in dash-dot lines in FIG. 2.

Figure 2:
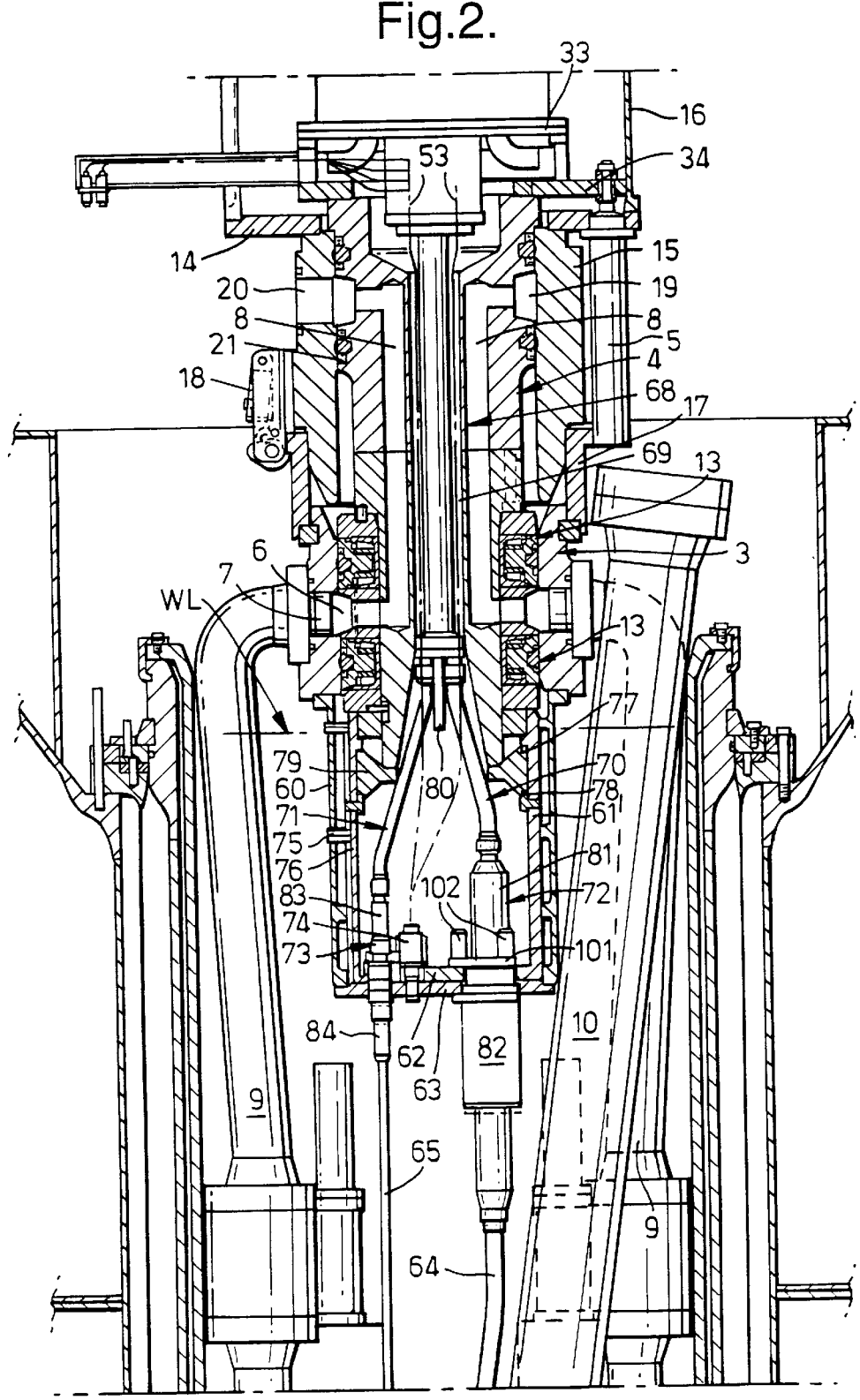
FIG. 2 shows an enlarged section of the buoy and the connector in FIG. 1.

As shown in FIG. 2, the female and male swivel members 3, 4 include cup-like housing members 60 and 61, respectively, which are insertable into each other. The lower bottom parts thereof are formed as coupling discs 62 and 63, respectively, which are provided with cooperating connector members for interconnection of the cables and lines from the electrohydraulic swivel 30 with corresponding cables and lines 64, 65 extending through the centre member 1 of the buoy between the connectors and a sea cable 66 which is terminated in a cable hanger 67 (see FIG. 1).

The power cables and the different electrical and/or fibre-optical signal lines from the electrohydraulic swivel 30 are carried down through the male swivel member 4 via a cable tube 68 extending through a central, axial passage 69 in the male swivel member 4, and which at its upper end is rigidly connected to the lower end of the column member 31 of the swivel 30. At its lower end the tube passes into a pair of hoses 70 and 71 of which one hose 70 receives a power cable and is connected to the upper part of a connector 72, whereas the other hose 71 receives signal lines and is connected to the upper part of a connector 73. Like the electrohydraulic swivel, the cable tube 68 as well as the hoses 70 and 71 are oil-filled, the tube and hoses being in fluid connection with the swivel.

In FIGS. 1 and 2 there is, for the sake of clearness, shown only one connector 72 for a power cable, even if in practice there will be arranged three hoses and connectors in the case of three-phase power transmission for high outputs (11 kV/600 A). For lower outputs (3,3 kV/125 A) a three-phase cable may be carried in each hose 70, and the connectors will also be three-phased.

As regards the hydraulic lines 53 from the electrohydraulic swivel, these are carried through the axial passage 69 of the male swivel member on the outside of the cable tube 68, and are connected to a hydraulic coupler 74. These lines may also have branchings (not shown) for pressurization of the seals forming part of the rotating connector. Contact between the cooperating connector members is established when the coupling discs 62, 63 are moved together in a controlled manner when inserting the male swivel member 4 in the female swivel member 3. For ensuring the correct mutual orientation of the coupling discs when these are moved together, the side walls of the housing members 60, 61 are provided with a guide means consisting of a lug 75 which is resiliently arranged in the side wall of the housing member 60 and which engages in a helical groove 76 arranged in the outer surface of the side wall of the housing member 61. During the final part of the interconnection movement the coupling disc 62 is guided to the correct position by a pair of guide pins (not shown) on one disc which are introduced in corresponding holes (neither shown) in the other disc. In this manner the correct mutual interconnection position of the connector members is secured, independent of in which position the buoy has been pulled in and locked in the receiving space of the vessel.

In the interconnected position of the swivel members 3 and 4, the housing members 60, 61 are locked to each other via the coupling discs. In order to allow turning of the male swivel member in case of a possible turning of the vessel about the centre member of the buoy, the housing member 61 therefore is rotatably mounted on the male swivel member. This is achieved by means of a pair of bearings 77, 78 arranged between the housing member 61 and an encircling supporting flange 79 which is fastened to the lower end of the male swivel member.

As stated above, the connectors in the present arrangement consist of underwater couplers, with the advantages involved thereby, as stated in the introduction. The housing members 60 and 61 thus will be filled with water during operation. For control of the water level WL in the housing member 61, there is arranged a water detector 80 at the upper end thereof, which detector is mounted on the lower end of the cable tube 68.

The underwater couplers for the power cables and for the electrical/optical signal cables consist of two units, viz. a plug member which is mounted on the upper coupling disc 62, and a receptacle member which is mounted on the lower coupling disc 63. Thus, in FIG. 2, the coupler 72 for the power cable is shown to consist of a plug member 81 and a receptacle member 82, whereas the coupler 73 for the electrical/optical control signals is shown to consist of a plug member 83 and a receptacle member 84.

Figure 4:
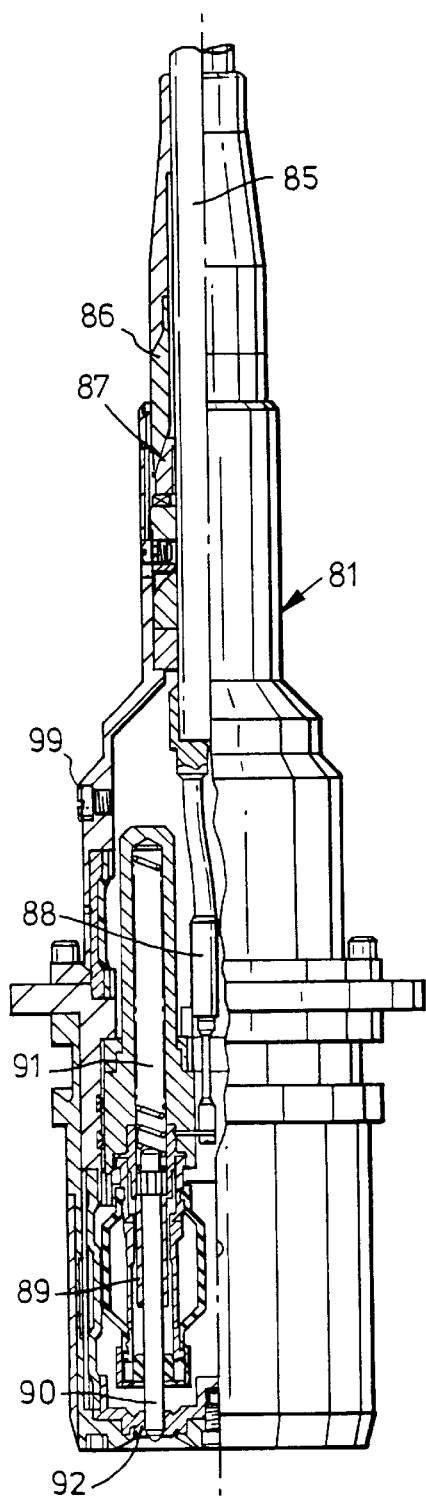
FIGS. 4 and 5 show a male member and a female member, respectively, of an underwater coupler, each of the members being shown partly in side view and partly in longitudinal section.
Figure 5:
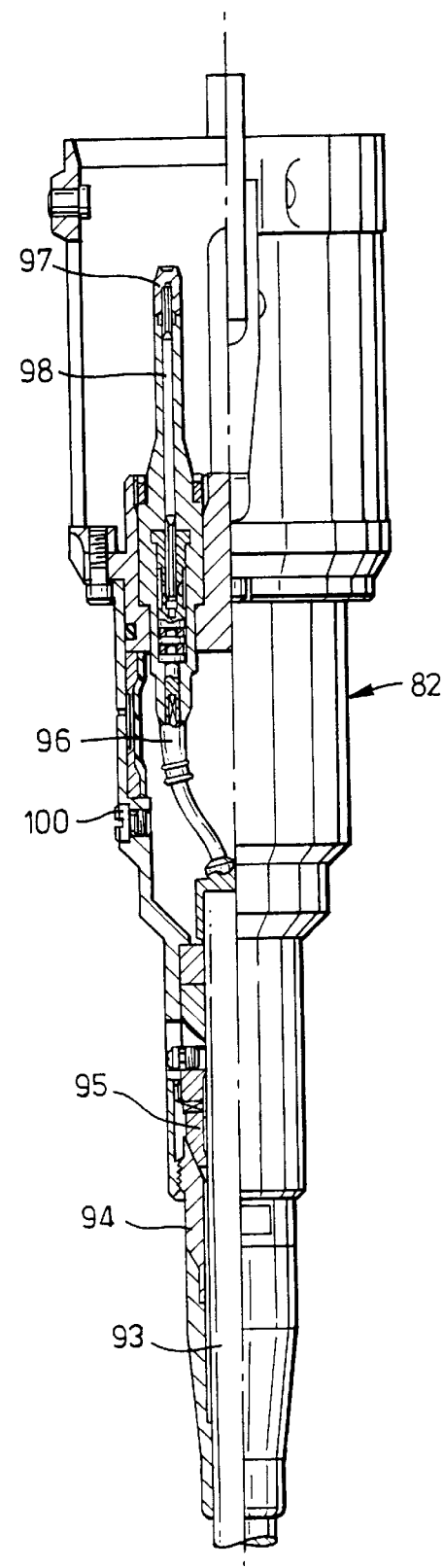

An embodiment of the underwater coupler 72 for power transmission is shown more in detail in FIGS. 4 and 5, wherein FIG. 4 shows the plug member 81 and FIG. 5 shows the receptacle member 82. The shown coupler is commercially available and supplied by the British company Tronic Electronic Services. Since the coupler is of a known design, only some main elements thereof will be described.

As shown in FIG. 4, the end 85 of the cable from the electrohydraulic swivel 30 is inserted into the plug member and retained by means of a cable nut 86 and a clamping sleeve 87. The stripped conductor end of the cable is retained in a terminating sleeve 88 and is in connection with a socket contact 89. The socket contact receives a so-called shuttle pin 90 which is biased by a spring 91 to an outer position in which the outer end of the shuttle pin goes through a seal 92 (when the plug member is disconnected from the receptacle member).

In the receptacle member 82 the end 93 of the cable 64 from the buoy is introduced and retained by means of a cable nut 94 and a clamping sleeve 95. The stripped conductor end of the cable is retained in a terminating sleeve 96 and is in connection with a contact pin 97 via a contact rod 98. When the plug member is introduced into the receptacle member, the contact pin 97 is brought into engagement with the socket contact 89, the shuttle pin 90 then being pressed into the housing receiving the spring 91.

Both the plug and the receptacle member is filled with silicone gel and is pressure-compensated. For filling and venting purposes the plug member is provided with a filling and venting screw 99, and the receptacle member is provided with a corresponding filling and venting screw 100.

For radial and axial tolerance during interconnection of the coupler members 81 and 82 these are mounted in a spring suspension means supplied together with the coupler. This means is schematically shown in FIG. 2 and comprises a spring-loaded disc 101 which is arranged on the plug member 81 and is mounted by means of three clamping bolts 102, one in each corner of the disc.

I claim:

1. A rotating connector for interconnection between at least one fluid passage (9) through a submerged buoy (1, 2) and a pipe system on a floating vessel for the production of hydrocarbons, comprising a pair of cooperating, fluid-transferring swivel members in the form of a female member (3) and a male member (4) which may be introduced axially into or withdrawn from each other, the female member being permanently fixed to the buoy (1, 2), and an electrohydraulic swivel (30) constituting a part of the male member (4) and being arranged for transfer of electrical power and electrical and hydraulic control signals, the swivel members (3, 4) at their lower ends comprising cooperating connector parts (81, 82; 83, 84) for interconnection of respective power, signal and hydraulic lines from the swivel and the buoy, CHARACTERIZED IN that the electrohydraulic swivel (30) is arranged on the top of the male swivel member (4) and comprises a slip-ring arrangement (37, 45) for the transfer of high electric power and control signals, and that the female and male swivel members (3, 4) include cup-like housing members (60, 61) which are insertable into each other and have coupling discs (62, 63) with said cooperating connector parts (81, 82; 83, 84) forming part of respective underwater couplers (72, 73), the housing members (60, 61) being arranged to be filled with water, for submerged operation of the underwater couplers (72, 73).

2. A rotating connector according to claim 1, CHARACTERIZED IN that, at the upper end of the housing member (61) of the male swivel member (4), there is arranged a water detector (80) for sensing of water level in the housing member.

3. A rotating connector according to claim 1 or 2, CHARACTERIZED IN that connecting cables (85) and lines between the electrohydraulic swivel (30) and the underwater couplers (72, 73) are carried through an oil-filled tube (68) which, at its upper end, is fastened to the swivel (30) and is carried through a central axial passage (69) in the male swivel member (4), and which, at its lower end, passes into oil-filled hoses (70, 71) connected to associated underwater couplers (72, 73).

4. A rotating connector according to claim 3, CHARACTERIZED IN that hydraulic pipelines (53) between the electrohydraulic swivel (30) and hydraulic connectors (74) on the couplings discs (62, 63) are carried through the axial passage (69) of the male swivel member on the outside of the oil-filled tube (68).

5. A rotating connector according to claim 1 CHARACTERIZED IN that mutually facing side walls of the housing members (60, 61) are provided with a helical guide means (75, 76) to guide the coupling disc (62) of the male swivel member (4) to the correct position relative to the coupling disc (63) of the female swivel member (3) when introducing the male swivel member (4) into the female swivel member (3).

6. A rotating connector according to claim 1, CHARACTERIZED IN that the electrohydraulic swivel (30) also includes a slip-ring means (43) for transferring fibre-optical control signals.

* * * * *